United States Patent [19]
Robinson

[11] 3,833,188
[45] Sept. 3, 1974

[54] PEDAL FORCE TRIMMING DEVICE
[75] Inventor: Franklin Davis Robinson, Palos Verdes, Calif.
[73] Assignee: Hughes Tool Company, Culver City, Calif.
[22] Filed: Oct. 24, 1972
[21] Appl. No.: 299,928

[52] U.S. Cl................ 244/17.19, 416/43, 416/140, 416/162
[51] Int. Cl............................................ B64c 27/82
[58] Field of Search ......... 416/25, 140, 162, 38, 43, 416/27, 29; 244/17.19, 17.25, 17.13, 17.11, 17.21, 17.23, 83 R, 83 D, 77 F, 76 R, 77 D, 76 A, 76 C; 60/39.07

[56] References Cited
UNITED STATES PATENTS

| | | | |
|---|---|---|---|
| 2,407,317 | 9/1946 | Mennesson | 416/38 |
| 2,992,796 | 7/1961 | Wheldon | 244/83 D X |
| 3,173,631 | 3/1965 | Hendrickson | 244/83 R |
| 3,429,198 | 2/1969 | Bretl | 244/83 D X |
| 3,583,828 | 6/1971 | White | 416/38 |

FOREIGN PATENTS OR APPLICATIONS
772,878   4/1957   Great Britain.................. 244/17.19

Primary Examiner—Trygve M. Blix
Assistant Examiner—Paul E. Sauberer
Attorney, Agent, or Firm—Smyth, Roston & Pavitt

[57] ABSTRACT

In a helicopter having a main rotor and a tail rotor each rotatable by an engine, foot pedals are operable to vary the pitch of the tail rotor through a linkage in order to maintain the desired disposition of the helicopter about a vertical axis. As the tail rotor rotates, natural forces are developed in its blades which tend to return them to a pitchless state. These forces are transmitted through the linkage to produce a load on the foot pedals. A pedal force compensator, responsive to the compressor discharge pressure of the engine, exerts a force at a particular point on the linkage to provide in all flight regimes an equivalent pedal force substantially equal in magnitude and opposite in direction to the pedal load. In this manner, the helicopter can be maintained in all flight regimes with substantially no pressure by the pilot on the foot pedals.

15 Claims, 5 Drawing Figures

PATENTED SEP 3 1974 3,833,188

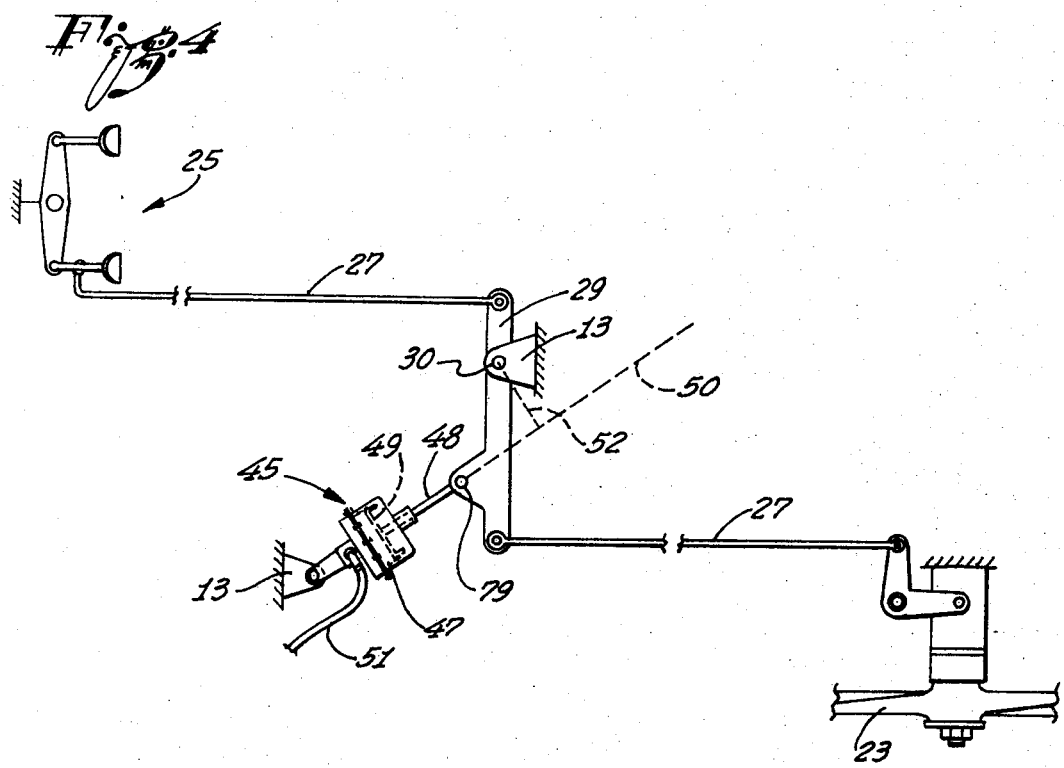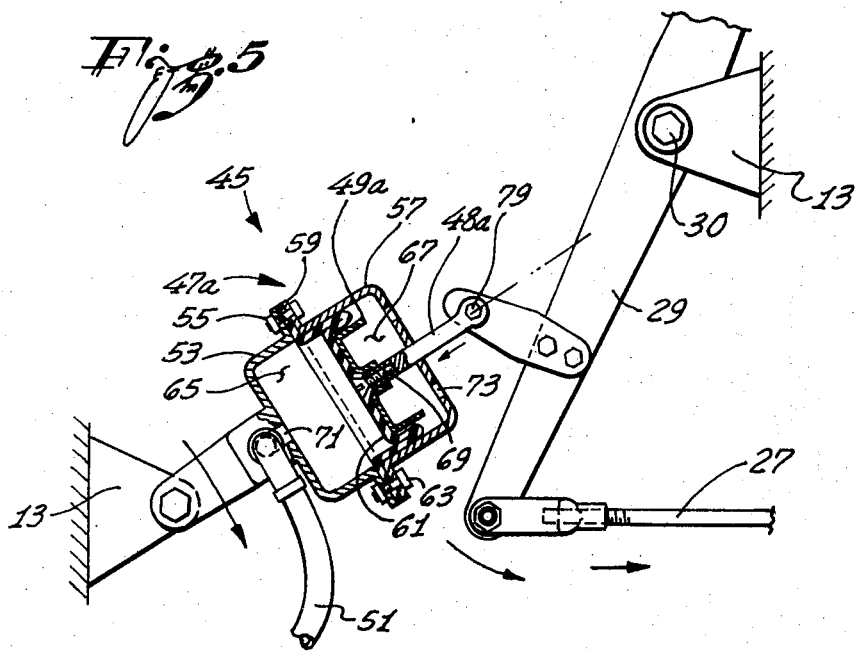

PEDAL FORCE TRIMMING DEVICE

BACKGROUND OF THE INVENTION

1. Field of the Invention

This invention relates generally to means for opposing the natural tendency of a rotor blade to seek a pitchless disposition when rotated and specifically to such means which are responsive to the compressor discharge pressure of a helicopter turbine engine.

2. Description of the Prior Art

In the past, helicopters have included main rotor blades and tail rotor blades which have been driven at substantially constant angular speeds by an engine. The primary function of the tail rotor blades is to resist the counter-rotations of the helicopter as the main rotor blades are turned. This counterrotation is opposed to a greater or lesser extent by varying the pitch and hence the thrust of the tail rotor blades. The pitch of the tail rotor blades is variable by the pilot through operation of foot pedals which are connected to the tail rotor by a linkage.

A rotating blade such as the tail rotor of a helicopter develops certain natural forces most of which tend to maintain the blades in a pitchless disposition. These forces, which appear as a load on the foot pedals are caused by many different phenomena. One such force is produced by the thrust of the blade when the center of pressure is located on either side of the pitch-change axis. Another of the forces results in an aerodynamic pitching moment which is developed when the blade includes a cambered airfoil.

The most significant of the natural forces, however, is a centrifugal twisting moment which is proportional to the pitch of the blade and the square of its angular velocity. This twisting moment, which is sometimes referred to as the "tennis racket effect," tends to return the blade to a flat pitch whenever the blade is feathered out of its plane of rotation. As the blade rotates, a centrifugal force is exerted upon each particle of mass in the blade. Substantially all of the centrifugal forces include components of force which tend to either increase or decrease the pitch of the blade. However, the magnitude of those components of force which tend to decrease the pitch of the blades far exceeds the magnitude of those components of force which tend to increase the pitch of the blades. This has resulted in a considerable moment on the tail rotor blades and a considerable load on the foot pedals. In the past, the pilot has opposed the pedal load by applying pressure to the foot pedals in order to maintain the desired pitch of the tail rotor blades. Since the natural forces have been continuous in a given flight regime, it has been desirable that the opposing pedal force also be continuous. Over a period of time the continuous application of the opposing force by the pilot has been particularly fatiguing.

Attempts have been made to attach weights to the rotor blades at strategic points in order to increase the magnitude of those components of centrifugal force which tend to increase the pitch of the blades. Theoretically, these additional force components help to resist the tennis racket effect. Unfortunately, however, the additional weights are particularly undesirable since they produce high oscillatory pitch link loads during forward flight, during hovering turns, and whenever there is tail rotor flapping. When the flapping velocity of the tail rotor is particularly high, these pitch link loads can exceed the structural fatigue limits of the blades, in which case the pilot will lose control of the helicopter.

Other attempts to resist the tennis racket effect have included the provision of a spring bungee which engages the linkage to aid in forcing the foot pedals to a desired position. The spring bungee can be an over-center device which alternatively biases the pedals to either increase or decrease the pitch of the tail rotor blades.

When the helicopter is not running, the spring bungee provides the foot pedals with characteristics similar to those of a toggle switch. This is particularly objectionable to pilots who like to check their controls prior to flight. For example, with one pedal biased to the floor by the spring bungee, the pilot might attempt to press the other pedal to the floor in order to check the pitch controls. However, as the spring bungee passes over center, it slams the pressed pedal to the floor. It can be appreciated that such a control check is highly unsatisfactory and particularly irritating. In addition, the spring bungee is expensive to manufacture, install, and maintain. It is relatively heavy and therefore not particularly desirable for use in aircraft. The spring bungee is also highly susceptible to failure due to its high bearing loads.

On very large helicopters, pedal forces have been decreased by means of power actuated control systems such as the systems commonly used to provide power steering in an automobile. These systems rely upon pumps and working valves to vary the pitch of the tail rotor blades when the foot pedals are operated. Due to the complexity of these systems, they have been particularly expensive and sometimes unreliable. The power actuated control systems are also heavy so that their use in lighter helicopters is undesirable.

A significant disadvantage of these power systems is the fact that they are not inherently fail-safe. Typically, when these power systems fail, the pilot must be able to vary the pitch of the tail rotor blades manually. If this is not possible, the Federal Aeronautics Administration requires that dual systems be provided. In some commercial applications, as many as three separate systems have been provided to increase the fail-safe characteristics of the helicopters. It can be appreciated that these back-up systems significantly increase the cost of the project. Furthermore, the combined systems are never 100 percent fail-safe since it is possible, though improbable, for them to fail simultaneously.

SUMMARY OF THE INVENTION

In the present invention a helicopter is provided with an engine, main rotor blades and tail rotor blades. A pair of foot pedals are operable through a linkage, including a bell crank, to provide the tail rotor blades with a desired pitch. The natural forces previously described produce a load on the bell crank and the foot pedals. With respect to the bell crank, this load produces a moment hereinafter referred to as the load moment. A compressor associated with the engine provides a fluid having a pressure which is dependent upon the torque of the main rotor blades.

A compensator, such as a pressure piston device, is responsive to the discharge pressure of the compressor to develop a particular force which also is dependent upon the torque of the main rotor blades. This compensator is pivotally mounted to the helicopter and the bell crank so that the particular force in combination with a particular moment arm produces an opposing moment on the bell crank which opposes the load moment. The opposing moment provided by the compensator produces an equivalent pedal force which opposes the pedal load. The particular moment arm of the opposing moment varies with the angle of the bell crank which in turn varies with the pitch of the tail rotor blades. Thus, the opposing moment and the associated equivalent pilot force are dependent upon the torque of the main rotor blades and the pitch of the tail rotor blades.

As the pitch of the tail rotor increases, the tennis racket effect also increases. However, the combination of the compressor discharge pressure and the particular moment arm produces an equivalent pedal force which is substantially that needed to overcome the load on the pedals. In fact, the difference between the pedal load and the equivalent pedal force is typically within the magnitude of the friction forces inherent in the linkage. It follows that for most flight regimes, the desired pitch on the tail rotor can be maintained with substantially no force added by the pilot to the foot pedals.

The compensator can be a rolling diaphragm cylinder having a piston movable within a housing and a diaphragm movable in part with the piston. The fluid is received from the compressor and the pressure thereof is exerted upon the piston of the compensator. The diaphragm produces a seal between the fluid inlet and the atmosphere so there is no drain of power from the compressor. There are also no running seals to wear and leak so the cylinder is highly reliable. Furthermore, in the absence of running seals the cylinder need not be highly machined.

The compensator is particularly lightweight, only ⅔ lbs., and therefore particularly adaptable for use with small as well as large helicopters. Since the compressor only provides pressure when the helicopter is under power, the compensator is only active at that time. This will be particularly appreciated by the pilots who want to check their tail rotor controls prior to flight. The compensator is 100 percent fail-safe since there is no interruption in the linkage between the foot pedals and the tail rotor blades. Backup systems are neither needed nor desired. The compensator is particularly uncomplicated and can be fitted to an existing helicopter with a minimum of installation time and expense. Even in light of all these advantages, the compensator is extremely effective. In substantially all flight regimes, an opposing pedal force is developed which differs from the pedal load by less than the magnitude of the frictional forces in the linkage. In other words, after the pedals have been initially positioned, the desired pitch of the tail rotor blades can be maintained automatically by the compensator without the addition of any pedal force by the pilot.

These and other features and advantages of the present invention will become more apparent with the following detailed description of the compensator taken in conjunction with the associated drawings.

Brief Description of the Drawings

DESCRIPTION OF THE DRAWINGS

Figure 1:
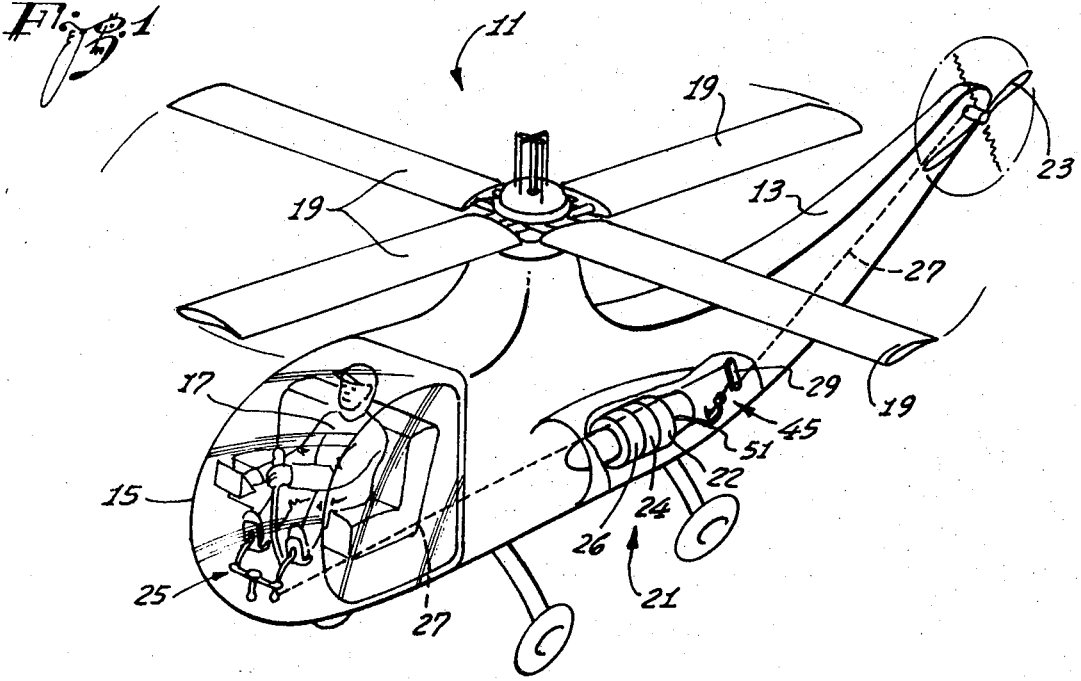
Figure 2:
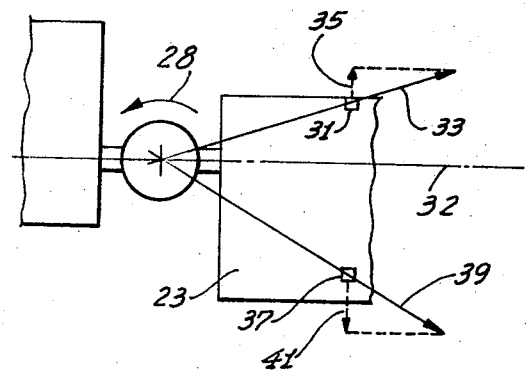
Figure 3:
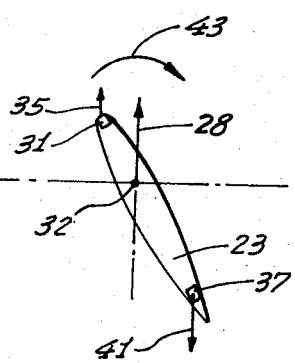

FIG. 1 is a perspective view of a helicopter in which the concepts of this invention are embodied;

FIG. 2 is a fragmentary side view of the tail rotor blades of the helicopter illustrated in FIG. 1;

FIG. 3 is an end view of one of the blades of the tail rotor illustrated in FIG. 2;

FIG. 4 is a plan view of the foot pedals and the tail rotor blades, and a side view of the linkage disposed therebetween and operably connected to a compensator; and FIG. 5 is an axial cross-section view of a particular embodiment of the compensator illustrated in FIG. 4.

DESCRIPTION OF PREFERRED EMBODIMENTS

A helicopter 11 is shown generally in FIG. 1 and designated by the reference numeral 11. The helicopter 11 typically includes a supporting structure or frame 13 and a fuselage 15 in which a pilot 17 is seated. Main rotor blades 19 are rotatably mounted on the frame 13 and driven by an engine 21 which may include a compressor 22, a combustion chamber 24 and a turbine 26. Engines of this type are commonly referred to as turbine engines or jet engines. As the main rotor blades 19 are forced to rotate in a first direction, an equal and opposite force is exerted upon the helicopter 11 so that it tends to rotate in a direction opposite to that of the main rotor blades 19. To compensate for this tendency of the helicopter 11 to counterrotate, a pair of tail rotor blades 23 having characteristics for rotating in a substantially vertical plane can be provided to maintain the desired disposition of the helicopter 11 about a vertical axis.

The main rotor blades 19 and the tail rotor blades 23 are rotatable by the engine 21 at a substantially constant speed. Since the thrust of a rotating blade is dependent upon its pitch, the helicopter 11 is provided with means for independently varying the pitch of the rotor blades 19 and 23. For example, within the fuselage 15, foot pedals 25 are disposed to be operable by the pilot 17 to control the pitch of the tail rotor blades 23. The foot pedals 25 include a right pedal and a left pedal which are connected to each other so that they move simultaneously in opposite directions. One of the pedals 25 can be connected through a linkage 27 to the tail rotor blades 23 so that the pitch of the tail rotor blades 23 can be increased or decreased by alternatively pressing one or the other of the foot pedals 25.

The mere movement of the pedals 25 to a desired position is not sufficient to maintain the desired pitch of the blades 23; for as the pitched blades 23 are rotated, substantial natural forces are exerted upon the blades 23 which tend to return them to a pitchless state. For example, the natural forces which oppose the pitch of the blades 23 include a moment produced by the thrust of the blades 23 when the center-of-pressure is located aft of the pitch change axis. Still another such force is an aerodynamic pitching moment which is developed when a cambered airfoil is used for the blades 23.

The most significant of the forces tending to return the blades 23 to a pitchless state, however, is a centrifugal twisting moment which is proportional to the pitch and the square of the angular velocity of the blade. This centrifugal twisting moment, which is commonly referred to as the "tennis racket effect," is the primary source of pedal load. The common name given to this effect is derived from the natural tendency of a tennis racket to lay flat in the plane of rotation when swung in a circular path.

As illustrated in FIGS. 2 and 3, this tennis racket effect produces a moment about the pitch-change axis 32 of the rotor blades 23. With the rotor blades 23 rotating in the direction of the arrow 28, each particle of mass will be provided with a centrifugal force component which tends to rotate the blades 23 into the path of rotation. For example, a first particle of mass 31 near the leading edge of the blades 23 experiences a centrifugal force 33 having a component 35 which produces a turning moment in the direction of the arrow 43. Similarly, a second particle of mass 37 near the trailing edge of the blades 23 experiences a centrifugal force 39 having a component 41 which also tends to rotate the blades 23 in the direction of the arrow 43. Although there are centrifugal force components which tend to increase the pitch of the blades 23, these components are far outweighed under normal pitch conditions by those components having the opposite effect.

These natural forces on the blades 23 are transmitted through the linkage 27 to produce a load on the pedals 25. The linkage 27 typically includes a bell crank 29 which pivots on the frame 13 at a point 30. With respect to this bell crank 29, the natural forces produce about the pivot point 30 a turning moment hereinafter referred to as the load moment.

Heretofore, in order to maintain the pitch on the blades 23, the pilot 17 has pushed on the pedals to oppose the load created thereon by the natural forces. This pilot force was transmitted through the linkage 27 to produce a moment counteracting the load moment in the bell crank 29. In some flight regimes, this pilot force has been as high as 33 pounds so that continued application of the force has been particularly fatiguing.

In the present invention, a compensator 45 is disposed to pivotally engage the frame 13 and the linkage 27 at opposite ends of the compensator 45. The purpose of the compensator 45 is to produce a particular force on the linkage 27 which tends to oppose the natural forces on the blades 23 and the associated load on the pedals 25. In a preferred embodiment, the compensator 45 pivotally engages the bell crank 29 so that the particular force of the compensator 45 produces an opposing moment on the bell crank 29 opposite in direction to the load moment. Thus, this opposing moment on the bell crank 29 is equivalent to the force previously applied by the pilot 17 to the pedals 25.

The compensator 45 is preferably a pressure piston device having a housing 47 and a piston 49 movable within the housing 47. The regions interior of the housing 47 can communicate with the compressor 22 through a hose 51 or tubing so that the discharge pressure of the compressor 22 is exerted upon the piston 49. The piston 49 is preferably connected to a rod 48 which extends through the housing 47 to engage the bell crank 29 at a pivot point 79. In such a device, the piston 49 provides means for producing a particular force proportional to the discharge pressure of the compressor 22. This force is transmitted through the rod 48 to the bell crank 29. As illustrated in FIG. 4, the force produced by the compensator 45 will extend axially of the rod 48 substantially on the dotted line 50. The opposing moment produced on the bell crank 29 in response to this force is proportional to the shortest distance between the dotted line 50 and the pivot point 30. This distance is typically referred to as the moment arm and in FIG. 4 is designated by the dotted line 52.

Although the compensator 45 such as a pressure piston device can be made responsive to any pressurized fluid, it is particularly desirable that the fluid be the gas discharged from the compressor 22. As previously noted, these gases have a pressure which is dependent upon the torque of the main rotor blades 19. Since the thrust on the tail rotor blades 23 is dependent upon the torque of the main rotor blades 19 in a trim state, it follows that the discharge pressure of the compressor 22 is also dependent upon the pitch of the tail rotor blades 23. Thus, the opposing force of the compensator 45 which produces the opposing moment on the bell crank 29 varies with the pitch of the blades 23 as do the natural forces which produce the load moment on the bell crank 29. These relationships are particularly valuable in providing the opposing moment with a magnitude substantially equal to that of the load moment.

In a preferred embodiment of the compensator 45, elements having characteristics similar to those of elements previously described are designated by the same numeral followed by the letter $a$. Thus, the compensator 45 can be a rolling diaphragm cylinder of the type illustrated in FIG. 5 and designated by the reference numeral 45$a$. In this preferred embodiment, a housing 47$a$ includes first portions 53 and second portions 57 each having a flange 55 and 59, respectively, extending circumferentially outwardly at one end of each of the portions 53 and 57. A diaphragm 61 can form a seal between the flanges 55 and 59, and a plurality of bolts 63 can secure the flanges 55 and 59 around the circumference of the housing 47$a$. In this manner, the first portions 53 and the diaphragm 61 define a first cavity 65 in the housing 47$a$, and the second portions 57 and the diaphragm 61 define a second cavity 67 in the housing 47$a$. The diaphragm 61, which may have a generally circular configuration, is preferably impermeable to air and typically includes rubber. The housing 47$a$ and the piston 49$a$ are preferably formed from a rigid material such as metal.

A piston 49$a$ is disposed interiorly of the second cavity 67, and a rod 48$a$ extends through the second portions 57 to engage the piston 49$a$. The cylinder 45$a$ can be provided with means, such as a screw 69, for maintaining the central portions of the diaphragm 61 in a fixed relationship with the piston 49$a$ and the rod 48$a$.

The first portions 53 of the cylinder 45$a$ define an orifice 71 registering with the tubing 51 to provide communication between the first cavity 65 and the compressor 22. As the discharge pressure of the compressor 22 varies in a manner dependent upon the torque of the main rotor blades 19, the pressure on the diaphragm 61 varies in a similar manner. More importantly, since the force of the piston 49$a$ on the rod 48$a$ is proportional to the pressure on the piston 49$a$, this particular force is also dependent upon the torque of the main rotor blades 19 and the pitch of the tail rotor blades 23.

The piston 49$a$ may move within the housing 47$a$ in response to the natural forces on the blades 23, the forces on the pedals 25, or the discharge pressure of the compressor 22. In response to this displacement of the piston 49$a$, the diaphragm 61 can roll between the sides of the housing 47$a$ and the piston 49$a$ so that running seals are neither needed nor desired. Running seals tend to wear and leak so the absence thereof in the compensator 45a is particularly advantageous. Also, the housing 47a need not be finely machined so the compensator 45a is not only more reliable but also less expensive. The second portions 57 of the housing 47a define at least one orifice 73 venting the second cavity 67 to the atmosphere so that there is no back pressure on the piston 49a.

The rolling diaphragm cylinder 45a is particularly desirable for the compensator 45 since the diaphragm 61 provides a seal between the first and second cavities 65 and 67, respectively. This seal enables the cylinder 45a to operate on a "dead-end" cylinder so that gas is not continuously bled from the compressor 22. Thus, without providing an additional load on the engine, the cylinder 45a merely senses the discharge pressure of the compressor 22 and provides a force on the rod 48a which is proportional to that pressure.

As previously noted, the magnitude of the opposing moment on the bell crank 29 is dependent upon the magnitude of the particular force produced by the compensator 45 and the length of the moment arm 52. It will also be noted that the length of the moment arm 52 varies with the angle of the bell crank 29 in accordance with a particular relationship which is dependent upon the location of the pivot point 79. Since the angle of the bell crank 29 in turn is dependent upon the pitch of the blades 23, it follows that the length of the moment arm 52 is also dependent upon the pitch of the blades 23.

The optimum area of the piston 49 and optimum placement of the pivot point 79 for a particular helicopter can be determined empirically by measuring the loads on the pedals 25 and the discharge pressure of the compressor 22 while the helicopter 11 is maintaining different flight regimes. With knowledge of the pedal loads, the load moments on the bell crank 29 can also be determined for these flight regimes. These variable inputs enable the optimum surface area of the piston 49 and the optimum placement of the pivot point 79 to be determined so that the opposing moment is not only opposite in direction but also substantially equal in magnitude to that of the load moment during each of the flight regimes. Thus, the compensator 45 can maintain the blades 23 at a desired pitch with the addition of substantially no pedal force by the pilot 17. Instead of having to oppose a pedal force of considerable magnitude, the pilot 17 can maintain the particular flight regime with his feet removed from the pedals 25.

The pitch on the blades 23 and the discharge pressure of the compressor 22 during a particular flight regime may vary with different types of helicopters. Therefore, the optimum surface area of the piston 49 and the optimum placement of the pivot point 79 may also vary with different types of helicopters.

By means of example, one embodiment of the invention is particularly adaptable for use with the series 369 helicopters, manufactured by Hughes Tool Company. Each of the helicopters in this particular series is turbine powered. In the following table, the discharge pressure of the compressor 22 (CDP), the angle of the bell crank 29 ($\theta$), and the uncompensated load on the left pedal 25 (Pedal Load) are tabulated for different flight regimes of a series 369 helicopter equipped with an aluminum tail rotor. In this particular embodiment of the compensator 45, the piston 49 has a surface area of 2.85 square inches. This area multiplied by the compressor discharge pressure is equal to the particular force (F) provided by the compensator 45.

The location of the pivot point 79 can be 2.77 inches from the pivot point 30 along the longitudinal dimension of the bell crank 29, and 1.50 inches from the pivot point 30 in a direction perpendicular to the longitudinal dimension of the bell crank 29. This location of the pivot point 79 determines the particular relationship between the angle $\theta$ of the bell crank 29 and the moment arm 52 ($\Delta$) which is also tabulated.

For each of the flight regimes, the product of the force F and the moment arm $\Delta$ determines the opposing moment on the bell crank 29. This opposing moment can be equated to an equivalent pedal force (EPF) which is also set forth in the table.

With the natural forces on the blades 23 producing a pedal load and the compensator 45 providing an equivalent pedal force opposing the pedal load, the difference of these forces must be provided in order to maintain the pitch of the blades 23. This differential force is tabulated under the column headed Diff. F.

|  | Pedal Load (lbs) | (degrees) | CDP (psi) | F (lbs) | $\Delta$ (inches) | EPF (lbs) | Diff. F. (lbs) |
|---|---|---|---|---|---|---|---|
| Steady Hover | 22 | 7.5 | 58.5 | 167 | 1.25 | 21 | 1 |
| Right Sideward Flight at 20mph | 33 | 13.6 | 61.5 | 175 | 1.76 | 31 | 2 |
| Climb-sea level | 9 | +.8 | 67.5 | 192 | .61 | 11.7 | 2.7 |
| Level flt at 100mph | 2 | −2.5 | 51 | 145 | .27 | 3.9 | 1.9 |
| Level flt at 120mph | 6 | −.8 | 58 | 165 | .45 | 7.4 | 1.4 |
| Autorotation at 60mph | −2 | −4.0 | 21 | 60 | .1 | .6 | 2.6 |

If the linkage 27 were frictionless, the force differential might be applied by the pilot 17. However, in the case of the series 369 helicopter, the friction forces inherent in the linkage 27 are usually three pounds or more. It is of particular interest that the force differentials (Diff. F) set forth in the table are less than three pounds. Under these highly desirable circumstances, the pilot 17 need not provide any additional force to the pedals 25. In other words, the pitch on the blades can be maintained in each of the flight regimes noted with the feet of the pilot 17 actually removed from the pedals 25.

Though the dimensions noted for the surface area of the piston 49 and the specific location of the pivot point 79 make the compensator 45 specifically adaptable for use with the series 369 helicopter, it will be appreciated that these dimensions can be varied to accommodate the particular load characteristics of any type of helicopter. Thus, any helicopter can be maintained in substantially any flight regime by the pilot without the application of any additional force to the pedals 25. A particular force dependent upon the torque of the main rotor blades 19 and hence the pitch of the tail rotor blades 23 can be provided by making the compensator 45 responsive to the discharge pressure of the compressor 22. By applying this particular force to the bell crank 29, an opposing moment can be produced thereon which is also proportional to the pitch of the blades 23. Thus, the characteristics of the blades 23 which are responsible for producing the natural forces can be relied upon to provide substantially equal and opposite forces to oppose the natural forces. The compensator 45 is fail-safe in that if it happens to burst, the effect on the engine performance would be negligible and the loads on the pedals would revert to those of a standard helicopter. The compensator 45 is light in weight, inexpensive to manufacture, and adaptable to existing helicopters.

If the rolling diaphragm cylinder 45a is used for the compensator 45, the invention can be provided with further advantages. For example, there will be no running seals to wear and provide leaks in the compensator 45. Furthermore, the cylinder 45a will have the characteristics of a "dead-end" cylinder and therefore will not waste any of the gas discharged from the engine 21.

Though the invention has been described with reference to particular embodiments, it will be apparent to those skilled in the art that the invention can be otherwise embodied. For this reason, the scope of the invention should be ascertained only with reference to the following claims.

I claim:

1. A helicopter, comprising in combination:
a frame;
tail rotor blade means having a variable pitch orientation;
means for rotatably mounting the blades on the frame,
a turbine engine mounted on the frame for providing said blades with an angular velocity, and including a compressor having a discharge pressure,
mechanical linkage for controlling the pitch orientation of said blades so that said blades produce a thrust which is dependent upon the pitch orientation and the angular velocity of said blades;
the rotation of said blades producing at least one force tending to orient said blades in a pitchless condition thereby producing a load on said linkage means which must be opposed to maintain a predetermined pitch orientation, and
compensator means cooperating with said linkage means and responsive to the discharge pressure of the compressor for applying directly to said linkage means a second force in opposition to the force on said linkage means for maintaining the predetermined pitch orientation on the blades.

2. A helicopter as set forth in claim 1 wherein said compensator means is operative to apply said second force to said linkage means, and said second force being equal in magnitude and opposite from the force tending to alter the predetermined pitch on said blades whereby the load on said linkage means is effectively opposed.

3. A helicopter as set forth in claim 1 wherein said compensator means includes a pressure piston device having a piston movable within a housing in response to variations in discharge pressure of said compressor, piston rod means movable in response to movement of said piston and cooperating to apply a force to said linkage means proportional to the discharge pressure of said compressor.

4. A helicopter as set forth in claim 3 wherein said linkage means includes a bell crank,
said pressure piston device being mounted to said frame for pivoting movement relative thereto,
said piston being mounted on said bell crank for pivoting movement relative thereto,
said bell crank being pivotally mounted on said frame and having an angle with respect to the frame which is dependent upon the pitch orientation of said blades, and
said discharge pressure of said compressor being operative to apply a force to said bell crank which substantially equalizes the force tending to orient said blades in a pitchless condition.

5. A pedal force trimming device for use in a helicopter powered by a turbine including a compressor and wherein said helicopter includes main rotor blades, tail rotor blades for maintaining the helicopter in a desired disposition about a vertical axis, foot pedals connected by movable linkage means and operative in response to force applied to said pedals to vary the pitch of said rotor blades depending upon the position of said foot pedals, and wherein forces are created during operation of said helicopter tending to orient said tail rotor blades in a pitchless orientation and producing a force on said pedals which must be overcome to maintain a predetermined pitch orientation thereof, said pedal force trimming device comprising:
compensator means directly engaging the movable linkage means and responsive to the discharge pressure of said compressor to provide a balancing force operative on said linkage which aids in maintaining the predetermined pitch orientation of said tail rotor blades in the absence of force applied to said pedals.

6. A pedal force trimming device as set forth in claim 5 wherein
said linkage has an inherent resistance to movement which provides a second pedal force which aids in maintaining the predetermined pitch orientation of said tail rotor blades, and
said compensator means providing a third force with a magnitude which differs from said balancing force by less than the second force whereby said second force in combination with said balancing force provides sufficient force to said linkage to maintain the predetermined pitch orientation of said tail rotor blades in the absence of force applied to said foot pedals.

7. A pedal force trimming device as set forth in claim 6 wherein the linkage means includes a bell crank having a variable angular displacement dependent upon the pitch of the tail rotor blades, and
said compensator means pivotally engaging the helicopter and the bell crank to exert on the bell crank a turning movement dependent upon the discharge pressure of the compressor and the pitch of the tail rotor blades.

8. A pedal trimming force device as set forth in claim 7 wherein said compensator includes:
a rigid housing pivotally engaging the helicopter and including a first and second cavity, a diaphragm fixed to the sides of the housing and movable interiorly of the housing to form said first and second cavities sealed from each other, the first cavity communicating with the compressor to provide a pressure on the diaphragm, a piston movable with the diaphragm and extending through an end of the housing to pivotally engage the bell crank, whereby the piston exerts a force on the bell crank which is dependent upon the discharge pressure of the compressor, and the moment arm of the force thus applied being dependent upon the pitch of the tail rotor blades.

9. A helicopter including:

a frame, a turbine engine fixed to the frame for driving said helicopter and including a compressor providing a discharge pressure, rotatable main rotor blade means driven by the engine to produce a first force tending to rotate the helicopter in a direction opposite to the rotation of the main rotor blade means, rotatable tail rotor blade means driven by the engine to produce a second force on the helicopter opposing the first force, the magnitude of the second force dependent upon the pitch of the tail rotor blade means, movable control means including foot pedals cooperating with the tail rotor blade means to vary the pitch of the tail rotor blade means to a predetermined pitch orientation, the relative predetermined position of said control means being related to the pitch orientation of said tail rotor blade means, the rotation of the tail rotor blade means producing a third force tending to alter the pitch orientation of said tail rotor blade means and tending to alter the relative position of said movable control means, the third force having a magnitude dependent upon the pitch of the tail rotor blade means and normally opposed by application of force to the foot pedals of said movable control means opposite in magnitude to said third force, compensator means cooperating with said movable control means to maintain the predetermined pitch orientation of said tail rotor blade means by applying a force to said movable control means preventing movement thereof from said relative predetermined position, and said compensator means including means responsive to said compressor discharge pressure to apply a force to said movable control means to maintain the relative predetermined position thereof whereby said predetermined pitch orientation of said tail rotor blade means is maintained in the absence of applied additional force to the foot pedals of said movable control means.

10. A helicopter as set forth in claim 9 wherein said third force is a variable force dependent upon the particular flight regime of said helicopter and the pitch of said tail rotor blade means, and said compensator means being operative to apply force to said movable control means which is variable but of a magnitude opposite that tending to cause said tail rotor blade means to assume a pitchless orientation in the particular flight regime.

11. A helicopter as set forth in claim 9 wherein:

said movable control means includes linkage means operatively controlling said tail rotor blade means, the relative position of said linkage being related to the pitch orientation of said tail rotor blade means, and said compensator means cooperating with said linkage means to produce a force moment thereon dependent upon the magnitude of said first force and the pitch of said tail rotor blade means for maintaining the related position of said linkage and the related pitch orientation of said rotor blade means.

12. A helicopter as set forth in claim 9 wherein:

said means responsive to said compressor discharge pressure include a pressure piston device, having a movable piston, said piston having a diaphragm member cooperating therewith and dividing said piston device into two cavities sealed from each other, means for coupling the discharge pressure of said compressor to one of said cavities to produce a force to urge said piston in the other of said cavities, and piston rod means cooperating with said piston to transmit said force to said control means.

13. A helicopter as set forth in claim 12 wherein said control means includes a bell crank, and said piston rod being connected to apply a force to said bell crank which is dependent upon the pressure on said piston.

14. A helicopter having an engine and main rotor blades producing a thrust dependent on the power of the engine comprising:

tail rotor blades having a variable pitch orientable to a predetermined condition for maintaining the stability of said helicopter, said tail blades being subjected to force conditions tending to orient said tail blades towards a pitchless condition, the engine providing a fluid with a particular pressure and being related to the thrust of the main rotor blades, control means operative to vary the pitch of said tail rotor blades, said control means including linkage means and foot pedal means, said force conditions creating a load on said linkage means and effective on said foot pedal means, and a pressure piston device connected to said control means and responsive to the pressure of said fluid to apply a force to said linkage means opposing the force conditions tending to alter the pitch condition of said tail blades towards a pitchless condition whereby the load effective on said foot pedals is sufficiently reduced to maintain a predetermined pitch condition of said tail rotor blades in the absence of an additional applied force.

15. The helicopter set forth in claim 14 further comprising:

a bell crank included in the control means and having an angular displacement dependent on the pitch of the tail rotor blades, and wherein the pressure piston device pivotally engages the bell crank.

* * * * *